(12) United States Patent
Davydov et al.

(10) Patent No.: US 12,218,733 B2
(45) Date of Patent: Feb. 4, 2025

(54) UPLINK RECEIVE BEAMFORMING FOR HIGH MOBILITY USER IN NETWORKS WITH CLOUD RADIO ACCESS NETWORK (C-RAN) ARCHITECTURE

(71) Applicant: Intel Corporation, Santa Clara, CA (US)

(72) Inventors: Alexei Davydov, Nizhny Novgorod (RU); Artyom Putilin, Kstovo (RU); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 17/695,256

(22) Filed: Mar. 15, 2022

(65) Prior Publication Data

US 2022/0321197 A1 Oct. 6, 2022

Related U.S. Application Data

(60) Provisional application No. 63/169,065, filed on Mar. 31, 2021.

(51) Int. Cl.
*H04B 7/08* (2006.01)
*H04B 7/0413* (2017.01)
*H04B 17/309* (2015.01)

(52) U.S. Cl.
CPC ......... *H04B 7/0854* (2013.01); *H04B 7/0413* (2013.01); *H04B 17/309* (2015.01)

(58) Field of Classification Search
CPC ... H04B 7/0854; H04B 17/309; H04B 7/0413
See application file for complete search history.

(56) References Cited

U.S. PATENT DOCUMENTS

| 2018/0176051 A1* | 6/2018 | Qian | H04L 27/2647 |
| 2022/0094420 A1* | 3/2022 | Cui | H04B 7/0404 |
| 2022/0123854 A1* | 4/2022 | Cederholm | H04L 1/0009 |
| 2022/0217018 A1* | 7/2022 | Huang | H04B 17/309 |
| 2022/0329289 A1* | 10/2022 | Huang | H04B 7/0456 |

OTHER PUBLICATIONS

Huang et al., "Functional Split of Zero-Forcing Based Massive MIMO for Fronthaul Load Reduction," IEEE Access; vol. 6 (2018); Digital Object Identifier 10.1109/ACCESS.2017.2788451; pp. 6350-6359.

* cited by examiner

*Primary Examiner* — Janice N Tieu
(74) *Attorney, Agent, or Firm* — Schwabe, Williamson & Wyatt, P.C.

(57) ABSTRACT

Various embodiments herein provide techniques for minimum mean-square error interference rejection combining (MMSE-IRC) processing of a received signal, distributed between a baseband unit (BBU) and a remote radio unit (RRU). The RRU may perform uplink receive beamforming (e.g., using maximum ratio combining (MRC)) based on multiple channel measurements (e.g., a set of multiple sounding reference signal (SRS) channel measurements) obtained on respective measurement signals transmitted by a user equipment (UE). The RRU may send the processed signal to the BBU for further processing. The BBU may perform MMSE-IRC based on the processed signal received from the RRU, e.g., using demodulation reference signals (DM-RSs). Other embodiments may be described and claimed.

24 Claims, 9 Drawing Sheets

UPLINK RECEIVE BEAMFORMING FOR HIGH MOBILITY USER IN NETWORKS WITH CLOUD RADIO ACCESS NETWORK (C-RAN) ARCHITECTURE

CROSS REFERENCE TO RELATED APPLICATION

The present application claims priority to U.S. Provisional Patent Application No. 63/169,065, which was filed Mar. 31, 2021, the disclosure of which is hereby incorporated by reference.

FIELD

Various embodiments generally may relate to the field of wireless communications.

BACKGROUND

Massive multiple input multiple output (MIMO) is considered as one of the promising technologies for fifth generation (5G) cellular networks. The use of large number of the antennas with digital transceiver units (TXRUs) at the base station (BS) greatly improves the capacity of the network through use of the advanced beamforming techniques effectively mitigating both inter- and intra-cell interferences.

In massive MIMO aided cloud radio access network (C-RAN), a set of remote radio units (RRUs) with large number of antennas are deployed in a certain geographical area and connected to a centralized baseband unit (BBU) through a high bandwidth and low-latency fronthaul (FH) link. Such C-RAN architecture facilitates different options of the functional split in the radio network, e.g., to achieve optimal tradeoff between BBU and RRU processing.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
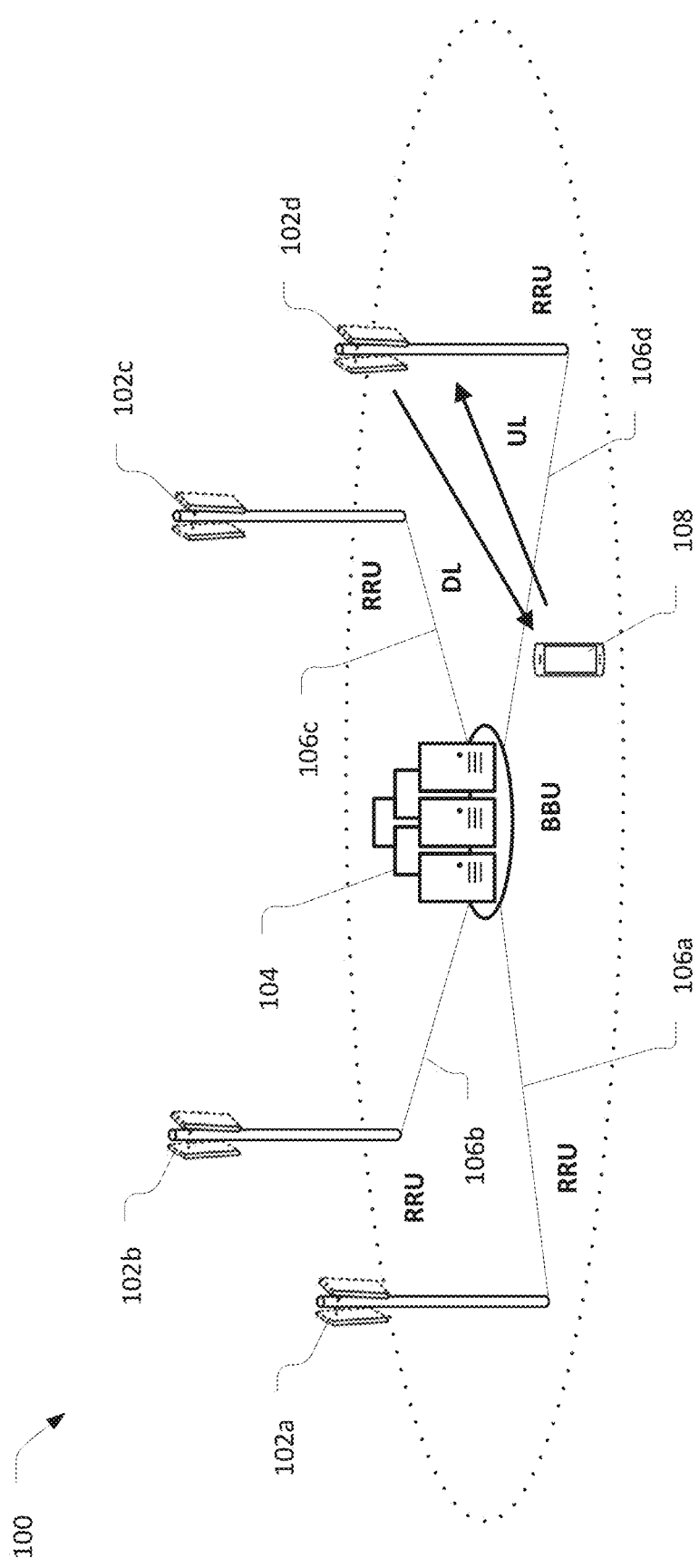
FIG. 1 illustrates a network environment in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for minimum mean-square error interference rejection combining (MMSE-IRC) processing of a received signal, distributed between a BBU and a RRU. The RRU may perform uplink receive beamforming (e.g., using maximum ratio combining (MRC)) based on multiple channel measurements (e.g., a set of multiple sounding reference signal (SRS) channel measurements) obtained on respective measurement signals transmitted by a user equipment (UE). The RRU may send the processed signal to the BBU for further processing. The BBU may perform MMSE-IRC based on the processed signal received from the RRU, e.g., using demodulation reference signals (DM-RSs).

One major performance bottleneck for the uplink reception in massive MIMO aided C-RAN is capacity of FH link. As the number of TXRUs and antennas at RRU are increased to obtain the massive MIMO gains, the amount of data traffic that needs to be transferred trough FH link also increases proportionally. To reduce traffic demands and transport cost a special functional split between RRU and BBU may be used, where the RRU implements a compression using receive (Rx) beamforming to reduce the amount of data transferred to the BBU. Such technique can alleviate the capacity bottleneck of limited fronthaul capacity while preserving the advantages of the massive MIMO antenna system.

One approach to implement the corresponding functional split is to perform Rx beamforming at RRU using maximum ratio combing (MRC) to compress the signal to smaller number of branches equal to the number of MIMO layers transmitted to the UE. The MRC may be relatively low complexity and thus able to be implemented at the RRU. After MRC-based compression, the remaining operations, e.g., including interference suppression from multiple MIMO layers, may be performed at the BBU (e.g., using MMSE-IRC processing).

The conventional functional split based on MRC and MMSE-IRC processing assumes close-to-perfect channel state information (CSI) at the receiver. While the assumption of perfect CSI provides a benchmark on the achievable system performance, it is difficult to achieve in practice. More specifically, receive beamforming at the RRU is typically derived based on SRS measurements. Since SRS transmission is not performed in every slot and corresponding Rx beamforming is provided with some delay, the MRC-based beamforming at the RRU may not be perfectly matched to the actual channel on physical uplink shared channel (PUSCH). The corresponding RRU beamforming mismatch may be substantially large in scenarios with high mobility of the UE, where the system design under perfect CSI assumption is not robust to CSI imperfection and thus suffers from significant performance degradation even with modest CSI mismatch at the receiver. Embodiments herein provide techniques to account for imperfect CSI at the receiver.

To illustrate, consider a synchronized 5G system operating in the presence of inter-cell interference and additive white Gaussian noise. An example is described for an uplink massive MIMO aided C-RAN system with RRU equipped with N-element antenna array receiving M data layers from the served UE. The received signal model on a given subcarrier can be represented as follows:

$$r = h \cdot s + z, \quad (1)$$

where r is a N×1 received signal vector, h is the N×M channel in antenna-element domain for scheduled user, and z is additive noise plus other-cell interference N×1 vector with covariance matrix $R_{zz} = E\{z \cdot z^H\}$.

The processing may be performed in two phases. In the first phase, the MRC processing with respect to the channel h is used at RRU to compress received signal to M branches, using $W_{MRC} = h^H$ as follows:

$$y = W_{MRC} r = \underbrace{h^H h}_{g} \cdot s + \underbrace{h^H z}_{n}. \quad (2)$$

where g and n are channel and interference plus noise vectors, respectively, in beamformed domain after Rx compression. Note that in Equation (2), perfect matching of the Rx beamforming $W_{MRC}$ to the actual channel h is assumed.

In the second phase of processing, the remaining operations including channel inversions which suppresses interference is handled at the BBU. More specifically, let s denote the estimation of the desired uplink transmit signal such that $\hat{s} = W_{MMSE} \cdot y$, where $W_{MMSE}$ denotes a linear MMSE-IRC function that performs beamforming minimizing the mean of the squared error. $W_{MMSE}$ may be defined as follows:

$$W_{MMSE} = (g^H R_{nn}^{-1} g + I_M)^{-1} g^H R_{nn}^{-1}, \quad (3)$$

where $I_M$ in Equation (3) is identity matrix of dimension M and $R_{nn} = E\{n \cdot n^H\}$ is the covariance matrix of the noise and interference after Rx beamforming compression. In practical systems, both channel g and interference covariance $R_{nn}$ matrices for Equation (3) may be estimated at the BBU using demodulation reference signal (DM-RS) of PUSCH transmission.

It is noted that for an N-antenna system with M layers the total number of branches after MRC beamforming is only M. In case of inaccurate CSI at the RRU (e.g., due to high mobility of the UE), MRC beamforming $W_{MRC}$ may not be matched to the actual channel h, therefore degrading the overall performance of the C-RAN system. The inaccuracy of CSI at the RRU for high mobility users may be due to fronthaul link delays and/or use of SRS channel measurements for Rx beamforming transmitted with certain periodicity.

Various embodiments herein provide techniques using the physical layer functional split for uplink reception implementing robust processing for high mobility users with inaccurate CSI at the RRU receiver. As further discussed below with respect to FIG. 4, the described techniques provide more robust uplink performance of the C-RAN network, while also providing moderated fronthaul loads.

For example, in various embodiments herein, multiple SRS channel measurements h may be used to perform extended MRC compression at the RRU. The additional SRS channel measurements may be obtained by time domain channel aggregation, frequency domain channel aggregation, and/or spatial domain channel aggregation from multiple Tx antennas of the UE.

FIG. 1 illustrates a network environment 100 for a RAN, in accordance with various embodiments. In some embodiments, the RAN may be a C-RAN and/or an open RAN (O-RAN). The network environment 100 may include a plurality of RRUs 102a-d communicatively coupled to a BBU 104 via a fronthaul (FH) link 106a-d. The RRUs 102a-d may communicate with one or more UEs, such as UE 108, via a set of antennas with digital transceiver units (TXRUs). The network environment 100 may be used for massive multiple input, multiple output (MIMO) communication.

In some embodiments, the BBU 104 may be further split into a distributed unit (DU) and a centralized unit (CU). In an O-RAN architecture, the RRUs 102a-d may be referred to as open radio units (O-RUs), the DU of the BBU 104 may be referred to as an open DU (O-DU), and the CU of the BBU 104 may be referred to as an open CU (O-CU).

In various embodiments, the RRU 102a-d may perform a first phase of processing using multiple channel measurements (e.g., SRS measurements) for a UE on respective channels. The channel may correspond to a serving cell of the one or more UEs, and may be associated with specific network resources (e.g., time, frequency, and/or spatial resources). The first phase may include receive (Rx) beamforming, e.g., using MRC, to compress the N received signals to L processed signals. The receive beamforming may be defined by a matrix of N by L, wherein L is less than N. The number N may correspond to a number of TXRUs in the antenna panel of the RRU 102a-d. The RRU 102a-d may send the processed signals after beamforming to the BBU 104 for a second phase of processing.

The second phase of processing at the BBU 104 may include linear combining of the compressed signals using a MMSE-IRC receiver. In some embodiments, the linear combination coefficients may be obtained at the BBU 104 using DM-RS signals.

In further detail, for reception of uplink transmission, multiple Rx beams at RRU may be used. Multiple Rx beamforming vectors may be derived from the multiple channels $\{h_k\}$ measured using SRS over different time, frequency, and/or spatial occasions. The set containing the corresponding L channel measurements may be defined as follows:

$$S_{i+L} = \{h_{i+1}, h_{i+2}, \ldots, h_{i+L}\}. \quad (4)$$

Then, extending MRC principles to the multiple channel measurements, the Rx beamforming at RRU may be defined as follows:

$$W_{MRC,ext} = \begin{bmatrix} h_{i+1}^H \\ \vdots \\ h_{i+L}^H \end{bmatrix} \quad (5)$$

where $(\ )^H$ is operation of Hermitian conjugation.

For high mobility users, due to high Doppler effect, the actual channel h on PUSCH may not be perfectly matched to individual Rx beams of the extended MRC. However, use of multiple Rx beamforming in $W_{MRC,ext}$ offers close to optimal combining in the second phase of the processing carried out at BBU. In particular, MMSE-IRC receiver may be used at BBU to perform linear combining of the compressed signals. In some embodiments, the linear combination coefficients may be obtained at the BBU using DM-RS signals.

Figure 2A:
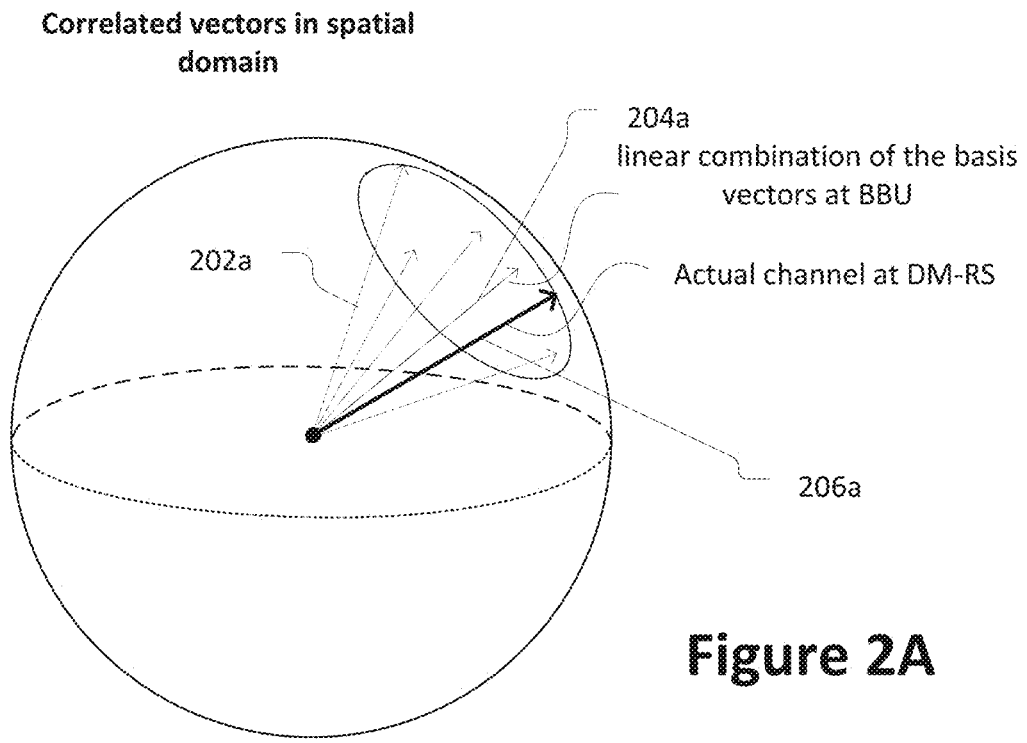
FIGS. 2A and 2B illustrate remote radio unit (RRU) and baseband unit (BBU) processing using multiple receive beams at the RRU with correlated vectors in the spatial domain and uncorrelated vectors in the spatial domain, respectively, in accordance with various embodiments.
Figure 2B:
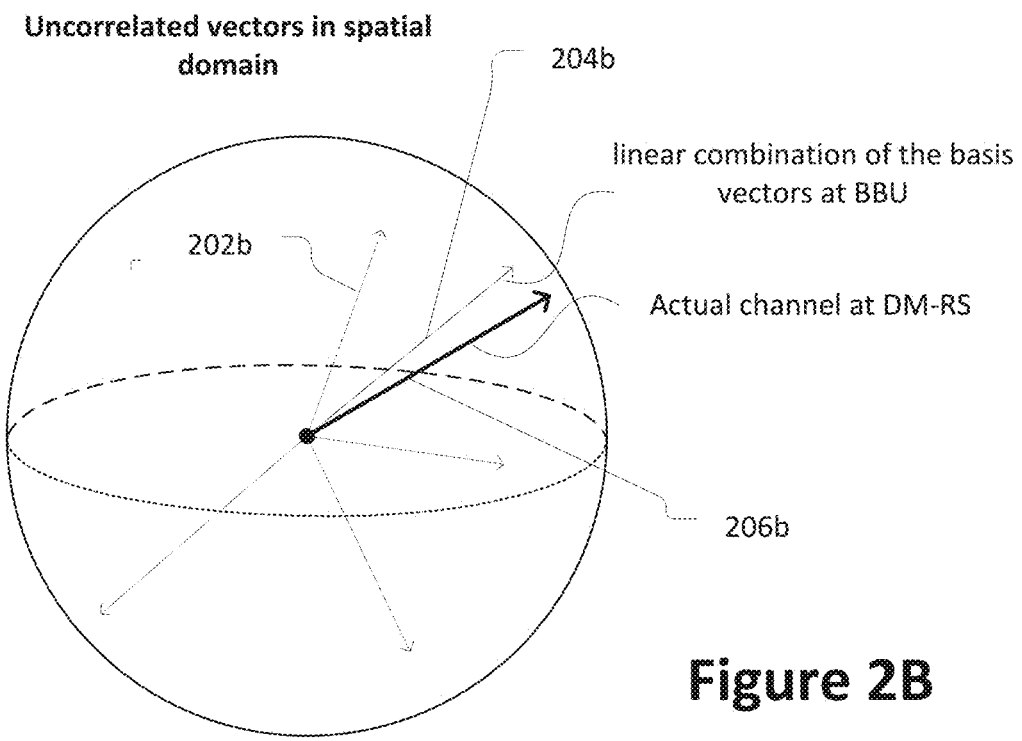

As illustrated in FIGS. 2A and 2B, overall processing at RRU and BBU matches Rx beamforming to the actual channel on PUSCH. FIGS. 2A and 2B illustrates Rx beams 202a-b, a linear combination 204a-b of the basis vectors based on the Rx beams 202a-b, and an actual channel vector 206a-b (e.g., based on DM-RS) for Rx beams that are correlated in the spatial domain and uncorrelated in the spatial domain, respectively. It can be seen that for the channels with spatial correlation (FIG. 2A), a fewer number of Rx beams of the extended MRC may be sufficient to match processing to the actual channel on PUSCH compared to the channels without spatial correlation (FIG. 2B).

The set $S_{i+L}$ of the channels for the first phase of processing at the RRU may be updated every time a new SRS measurement is done. For example, for time domain channel aggregation, the new set may be defined as follows $S_{i+L+1}$ $\{S_{i+L}\backslash h_{i+1}, h_{i+L+1}\}$, e.g., oldest SRS measurement $h_{i+1}$ is replaced in $S_{i+L+1}$ by the latest measurements $h_{i+L+1}$. In other embodiments, correlation between channel measurements from set $S_{i+L}$ and new measurement $h_{i+L+1}$ can be used. More specifically, channel measurement $h_{i+j}$ from set $S_{i+L}$ having the highest correlation to the latest SRS measurement $h_{i+L+1}$ may be removed.

Figure 3:
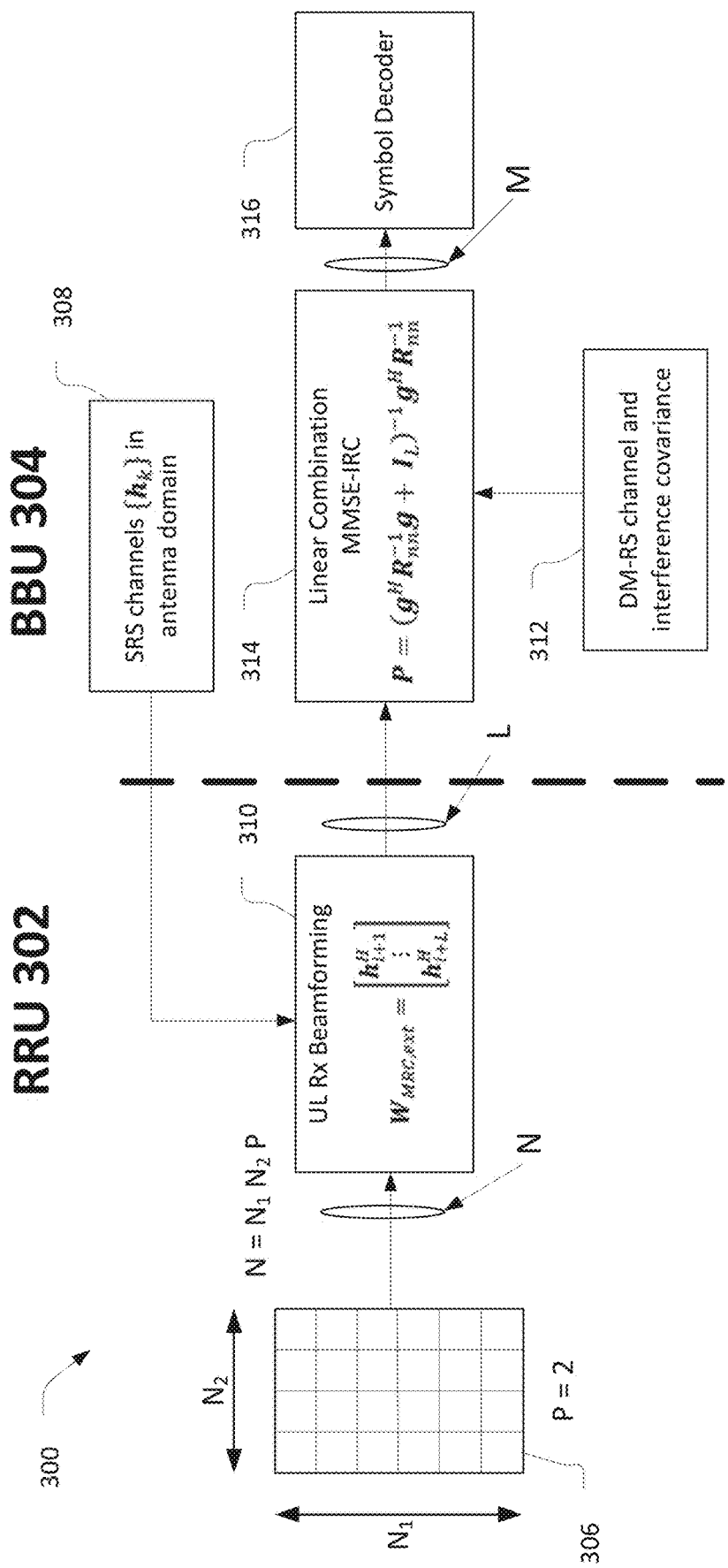
FIG. 3 illustrates functional split of processing between a RRU and BBU in accordance with various embodiments.

FIG. 3 is block diagram to illustrate a distributed MMSE-IRC process 300 in accordance with various embodiments. The process 300 may be distributed between an RRU 302 and a BBU 304. The RRU 302 may include an antenna array 306 with N elements to receive M data layers from UEs served by the RRU 302. The N elements may correspond to the number of TXRUs (e.g., N1×N2 for a rectangular antenna array) multiplied by a number of polarizations of the TXRUs (e.g., 2 polarizations, such as vertical and horizontal).

In embodiments, the RRU 302 may receive a signal via the antenna array 306 that corresponds to a channel of one or more UEs. The RRU 302 may further receive information associated with multiple SRS channels $\{h_k\}$. For example, the SRS channel information may be received from the BBU 304, as shown at 308 of process 300. Multiple Rx beamforming vectors may be derived from the multiple channels $\{h_k\}$ measured using SRS over different time, frequency, and/or spatial occasions, as described herein. At 310, the RRU 302 may perform receive beamforming based on the received signal and the multiple SRS channels, e.g., using MRC. For example, the receive beamforming may be performed according to Equation (5). The receive beamforming at 310 may be performed using L×N beamforming matrix to generate a processed signal with L elements from the received signal with N elements on a given subcarrier. The RRU 302 may pass the processed signal (e.g., compressed channel) generated by the MRC to the BBU 304 (e.g., via the fronthaul link).

At 312, the BBU 304 may determine the DM-RS channel and the interference covariance after Rx beamforming. For example, the DM-RS channel after Rx beamforming may correspond to g=Wh. The interference covariance may be determined as follows:

$$R_{nn} = E\{nn^H\} = WR_{zz}W^H \quad (6)$$

wherein $R_{nn}$ is the interference plus noise covariance after Rx beamforming, W is the receive Rx beamforming (e.g. MRC based on channel), and $R_{zz}$ is interference plus noise covariance matrix before RRU beamforming.

At 314, the BBU 304 may perform linear combination based on MMSE-IRC (Minimum Mean Square Error Interference Rejection Combining) processing on the processed signal received from the RRU 302 (e.g., based on the DM-RS channel and/or interference covariance). In some embodiments, the MMSE-IRC processing at 314 may be performed according to:

$$P = (g^H R_{nn}^{-1} g + I_L)^{-1} g^H R_{nn}^{-1} \quad (7)$$

wherein $I_L$ is an identity matrix of dimension L and $(\cdot)^{-1}$ is the operation of matrix inversion.

The BBU 204 may provide the output signal (e.g., after processing using P) to a symbol decoder 316 (which may be included in the BBU 204) to decode the data (e.g., in the M layers of the output signal).

Figure 4:
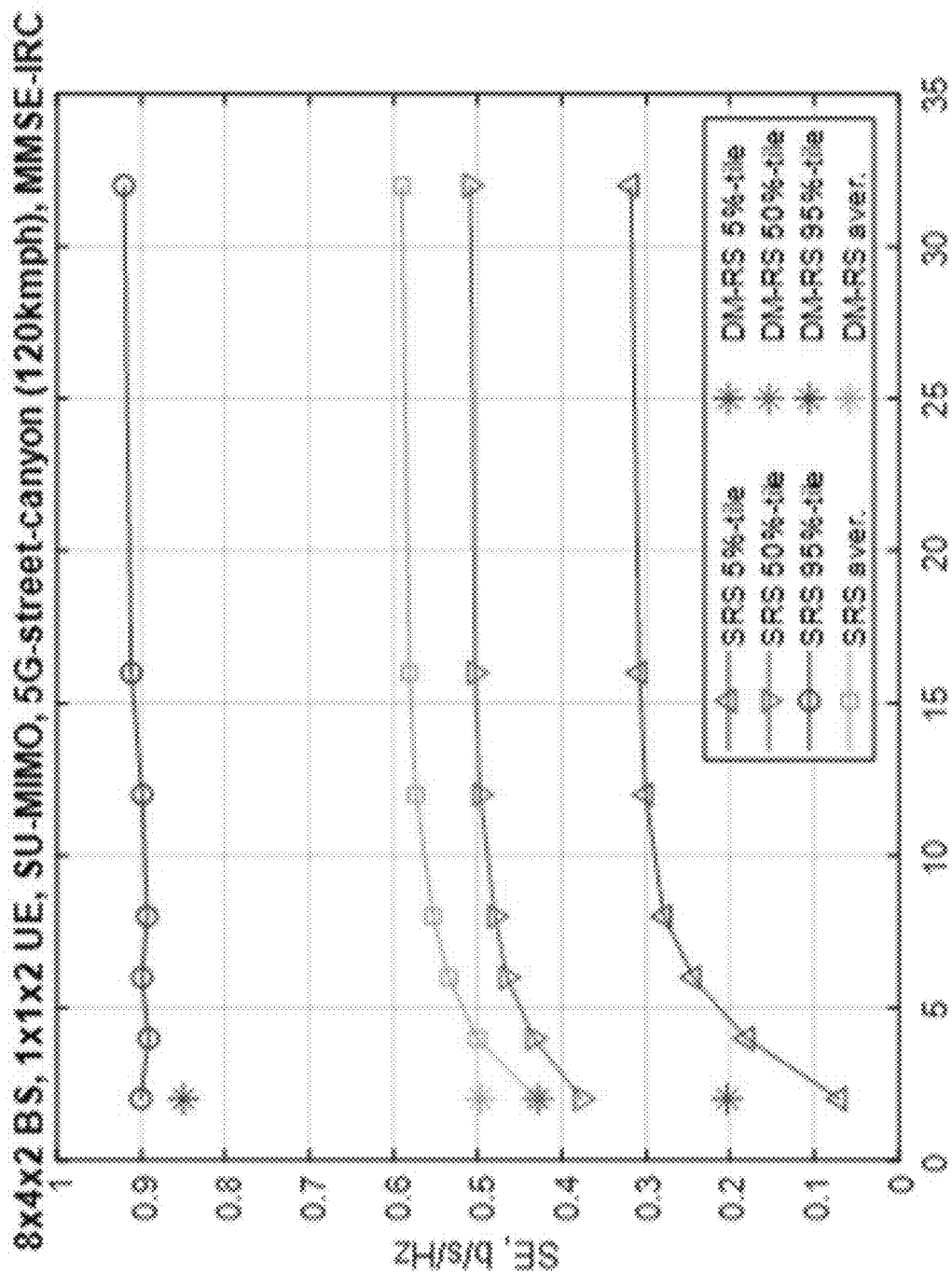
FIG. 4 illustrates simulation results in accordance with various embodiments.

To demonstrate performance benefits of the described embodiments, the inventors performed system-level simulations. The results of system-level simulations are presented in FIG. 4 for different numbers of Rx beamforming branches L={2, 4, 6, 8, 12, 16, 32} at RRU. The simulations were performed using a dense urban scenario with outdoor users moving with 120 kilometer per hour (kmph) speed. For a given L (the number of Rx beams for compression), MRC beamforming was derived using SRS channel measurements collected over L/2 time instances with two SRS antenna ports. In FIG. 4, L=2 corresponds to the conventional MRC.

For performance metric user spectral efficiency (SE) (measured in bits per second (bps)/Hz) was considered and is provided for 5%-tile, 50%-tile and 95%-tile of cumulative distribution function (CDF) distribution in addition to average SE. As a performance reference, MRC compression based on the instantaneous PUSCH channel was used which does not have Rx beamforming mismatch issue. The performance of the baseline scheme is shown as star points.

It can be seen from the simulation results in FIG. 4 that the spectral efficiency based on single SRS channel measurements (L=2) has substantial performance loss compared to the baseline performance of the reference signals. The performance loss can be explained by noticeable mismatch between Rx beamforming at RRU derived from SRS transmitted with 5 ms periodicity and the actual PUSCH channel.

When the functional split described herein is considered (shown in solid curves), the uplink performance becomes more robust to mismatch between Rx beamforming and the actual channel. In particular, for extended MRC with L=6 beams, the PUSCH performance becomes better than the reference system.

It is noted that for L>6 the performance of the processing scheme described herein outperforms the reference system. Multiple Rx beamforming branches of the extended MRC offers not only more accurate match of the beamforming to the actual channel, but also additional degrees of freedom for interference rejection at BBU using MMSE-IRC processing.

Figure 5:
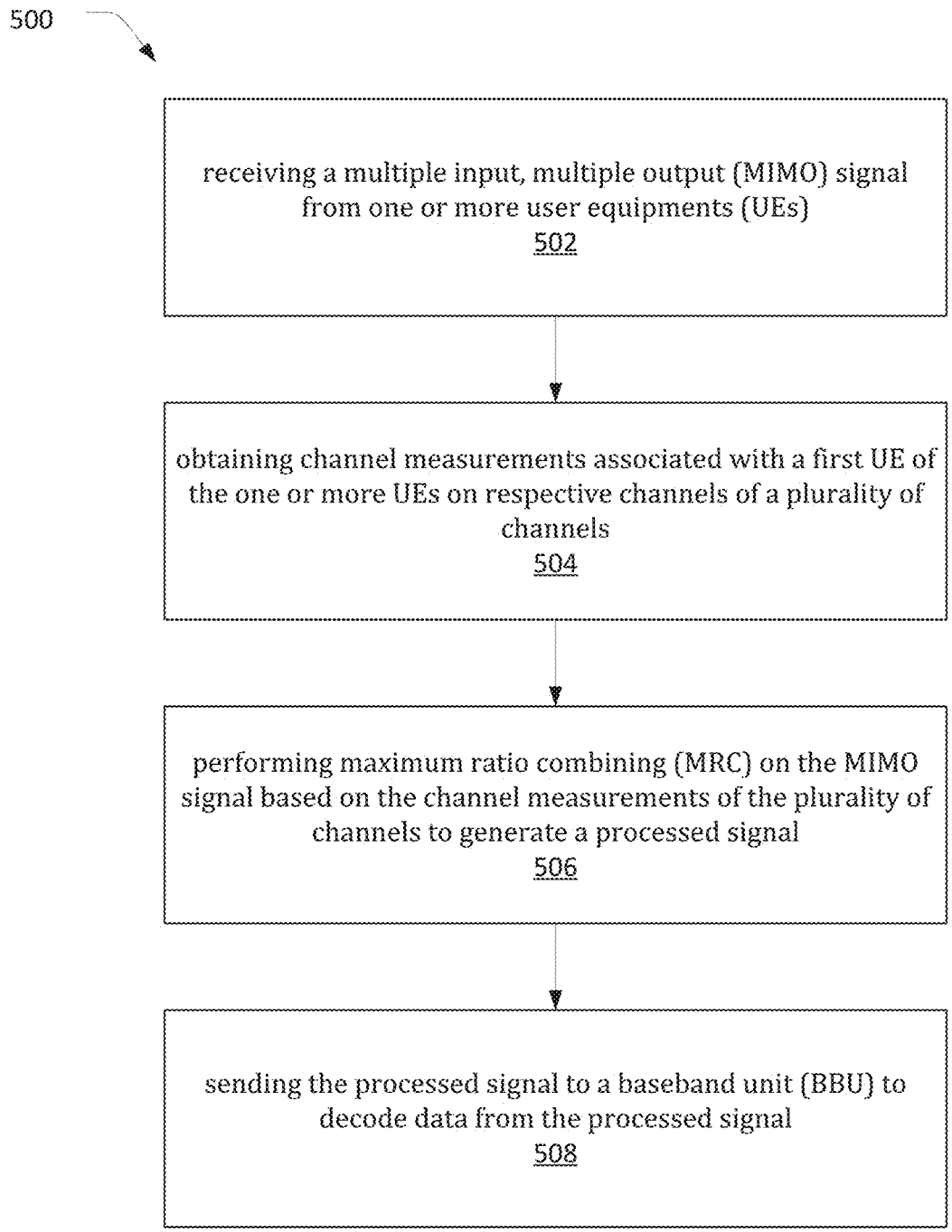
FIG. 5 illustrates a process of a remote radio unit (RRU) in accordance with various embodiments.

FIG. 5 illustrates a process 500 of a RRU in accordance with various embodiments. In some embodiments, the process 500 may be performed by baseband circuitry and/or radio frequency (RF) circuitry of the RRU.

At 502, the process 500 may include receiving a multiple input, multiple output (MIMO) signal from one or more user equipments (UEs). For example, the MIMO signal may be received via an antenna array of TXRUs, such as antenna array 306.

At 504, the process 500 may further include obtaining channel measurements associated with a first UE of the one or more UEs on respective channels of a plurality of channels. For example, the channel measurements may be SRS channel measurements. The channels may be associated with different time domain resources, different frequency domain resources, and/or different spatial domain resources.

At 506, the process 500 may further include performing maximum ratio combining (MRC) on the MIMO signal based on the channel measurements of the plurality of channels to generate a processed signal. For example, the MRC may be performed according to equation (5) discussed herein.

At 508, the process 500 may further include sending the processed signal to a baseband unit (BBU) to decode data from the processed signal. For example, the processed signal may be sent to the BBU via the fronthaul link.

Figure 6:
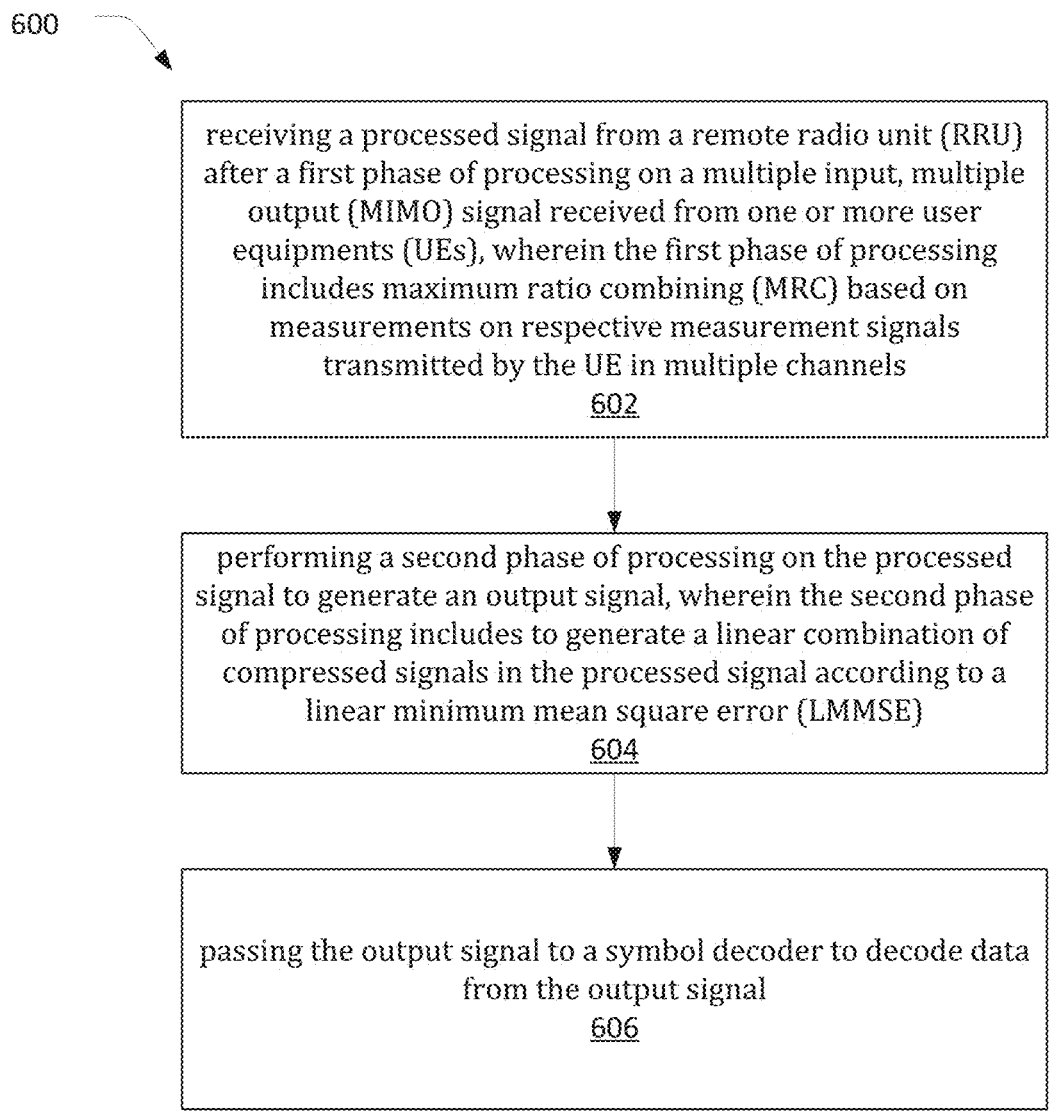
FIG. 6 illustrates a process of a baseband unit (BBU) in accordance with various embodiments.

FIG. 6 illustrates a process 600 of a BBU in accordance with various embodiments. In some embodiments, the process 600 may be performed by baseband circuitry and/or RF circuitry of the BBU.

At 602, the process 600 may include receiving a processed signal from a remote radio unit (RRU) after a first phase of processing on a multiple input, multiple output (MIMO) signal received from one or more user equipments (UEs), wherein the first phase of processing includes maximum ratio combining (MRC) based on measurements on respective measurement signals transmitted by the UE in multiple channels. For example, the measurements may be SRS measurements. The channels may be associated with different time domain resources, different frequency domain resources, and/or different spatial domain resources.

At 604, the process 600 may further include performing a second phase of processing on the processed signal to generate an output signal, wherein the second phase of processing includes to generate a linear combination of compressed signals in the processed signal according to a linear minimum mean square error (LMMSE).

At 606, the process 600 may further include passing the output signal to a symbol decoder to decode data from the output signal.

Systems and Implementations

Figure 7:
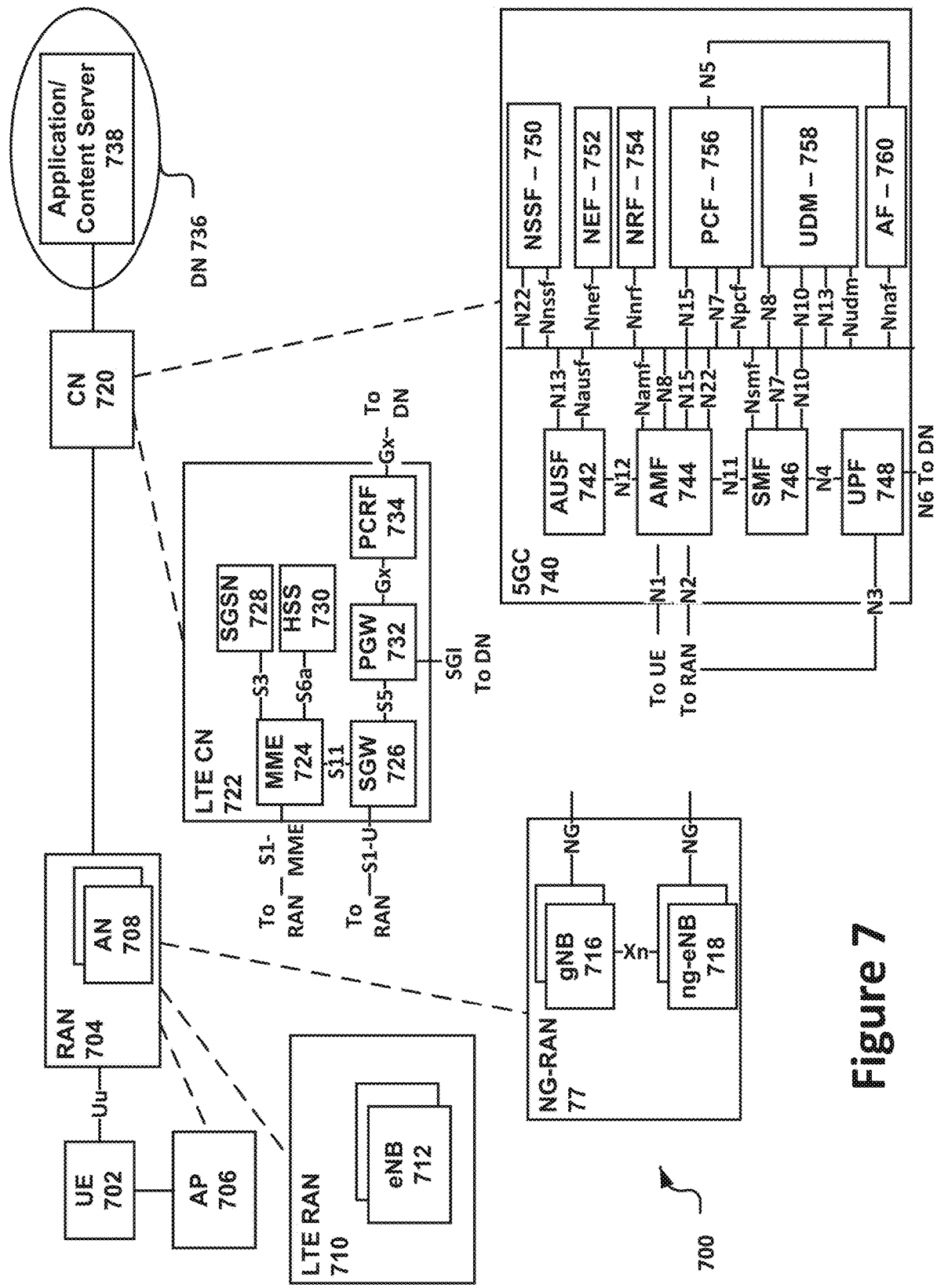
FIG. 7 illustrates a network environment in accordance with various embodiments.
Figure 8:
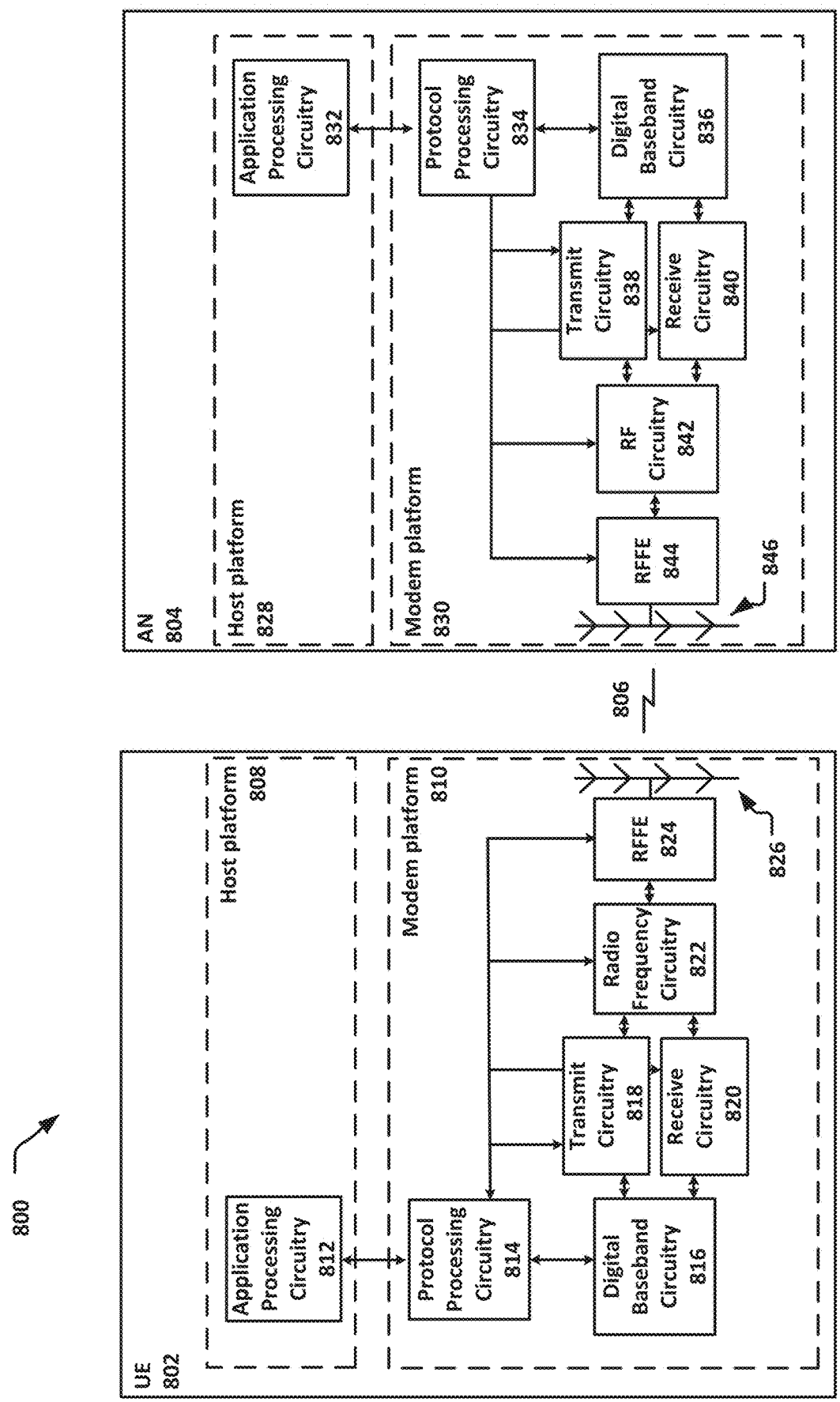
FIG. 8 schematically illustrates a wireless network in accordance with various embodiments.
Figure 9:
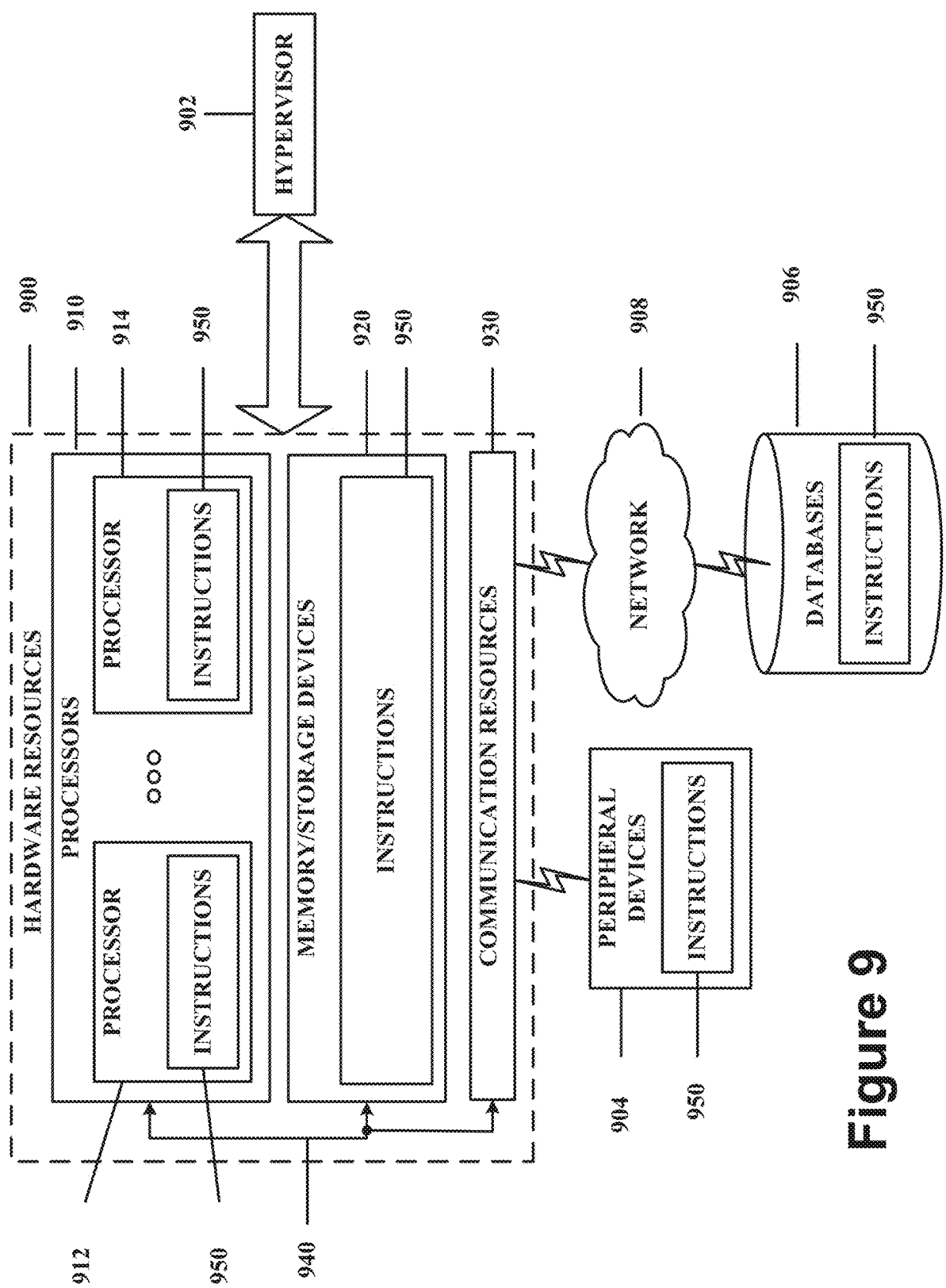
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 7-9 illustrate various systems, devices, and components that may implement aspects of disclosed embodiments.

FIG. 7 illustrates a network 700 in accordance with various embodiments. The network 700 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 700 may include a UE 702, which may include any mobile or non-mobile computing device designed to communicate with a RAN 704 via an over-the-air connection. The UE 702 may be communicatively coupled with the RAN 704 by a Uu interface. The UE 702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 702 may additionally communicate with an AP 706 via an over-the-air connection. The AP 706 may manage a WLAN connection, which may serve to offload some/all network traffic from the RAN 704. The connection between the UE 702 and the AP 706 may be consistent with any IEEE 802.11 protocol, wherein the AP 706 could be a wireless fidelity (Wi-Fi®) router. In some embodiments, the UE 702, RAN 704, and AP 706 may utilize cellular-WLAN aggregation (for example, LWA/LWIP). Cellular-WLAN aggregation may involve the UE 702 being configured by the RAN 704 to utilize both cellular radio resources and WLAN resources.

The RAN 704 may include one or more access nodes, for example, AN 708. AN 708 may terminate air-interface protocols for the UE 702 by providing access stratum protocols including RRC, PDCP, RLC, MAC, and L1 protocols. In this manner, the AN 708 may enable data/voice connectivity between CN 720 and the UE 702. In some embodiments, the AN 708 may be implemented in a discrete device or as one or more software entities running on server computers as part of, for example, a virtual network, which may be referred to as a CRAN or virtual baseband unit pool. The AN 708 be referred to as a BS, gNB, RAN node, eNB, ng-eNB, NodeB, RSU, TRxP, TRP, etc. The AN 708 may be a macrocell base station or a low power base station for providing femtocells, picocells or other like cells having smaller coverage areas, smaller user capacity, or higher bandwidth compared to macrocells.

In embodiments in which the RAN 704 includes a plurality of ANs, they may be coupled with one another via an X2 interface (if the RAN 704 is an LTE RAN) or an Xn interface (if the RAN 704 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 704 may each manage one or more cells, cell groups, component carriers, etc. to provide the UE 702 with an air interface for network access. The UE 702 may be simultaneously connected with a plurality of cells provided by the same or different ANs of the RAN 704. For example, the UE 702 and RAN 704 may use carrier aggregation to allow the UE 702 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 704 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 702 or AN 708 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 704 may be an LTE RAN 710 with eNBs, for example, eNB 712. The LTE RAN 710 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 704 may be an NG-RAN 714 with gNBs, for example, gNB 716, or ng-eNBs, for example, ng-eNB 718. The gNB 716 may connect with 5G-enabled UEs using a 5G NR interface. The gNB 716 may connect with a 5G core through an NG interface, which may include an N2 interface or an N3 interface. The ng-eNB 718 may also connect with the 5G core through an NG interface, but may connect with a UE via an LTE air interface. The gNB 716 and the ng-eNB 718 may connect with each other over an Xn interface.

In some embodiments, the NG interface may be split into two parts, an NG user plane (NG-U) interface, which carries traffic data between the nodes of the NG-RAN 714 and a UPF 748 (e.g., N3 interface), and an NG control plane (NG-C) interface, which is a signaling interface between the nodes of the NG-RAN 714 and an AMF 744 (e.g., N2 interface).

The NG-RAN 714 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 702 can be configured with multiple BWPs where each BWP configuration has a different SCS. When a BWP change is indicated to the UE 702, the SCS of the transmission is changed as well. Another use case example of BWP is related to power saving. In particular, multiple BWPs can be configured for the UE 702 with different amount of frequency resources (for example, PRBs) to support data transmission under different traffic loading scenarios. A BWP containing a smaller number of PRBs can be used for data transmission with small traffic load while allowing power saving at the UE 702 and in some cases at the gNB 716. A BWP containing a larger number of PRBs can be used for scenarios with higher traffic load.

The RAN 704 is communicatively coupled to CN 720 that includes network elements to provide various functions to support data and telecommunications services to customers/subscribers (for example, users of UE 702). The components of the CN 720 may be implemented in one physical node or separate physical nodes. In some embodiments, NFV may be utilized to virtualize any or all of the functions provided by the network elements of the CN 720 onto physical compute/storage resources in servers, switches, etc. A logical instantiation of the CN 720 may be referred to as a network slice, and a logical instantiation of a portion of the CN 720 may be referred to as a network sub-slice.

In some embodiments, the CN 720 may be an LTE CN 722, which may also be referred to as an EPC. The LTE CN 722 may include MME 724, SGW 726, SGSN 728, HSS 730, PGW 732, and PCRF 734 coupled with one another over interfaces (or "reference points") as shown. Functions of the elements of the LTE CN 722 may be briefly introduced as follows.

The MME 724 may implement mobility management functions to track a current location of the UE 702 to facilitate paging, bearer activation/deactivation, handovers, gateway selection, authentication, etc.

The SGW 726 may terminate an S1 interface toward the RAN and route data packets between the RAN and the LTE CN 722. The SGW 726 may be a local mobility anchor point for inter-RAN node handovers and also may provide an anchor for inter-3GPP mobility. Other responsibilities may include lawful intercept, charging, and some policy enforcement.

The SGSN 728 may track a location of the UE 702 and perform security functions and access control. In addition, the SGSN 728 may perform inter-EPC node signaling for mobility between different RAT networks; PDN and S-GW selection as specified by MME 724; MME selection for handovers; etc. The S3 reference point between the MME 724 and the SGSN 728 may enable user and bearer information exchange for inter-3GPP access network mobility in idle/active states.

The HSS 730 may include a database for network users, including subscription-related information to support the network entities' handling of communication sessions. The HSS 730 can provide support for routing/roaming, authentication, authorization, naming/addressing resolution, location dependencies, etc. An S6a reference point between the HSS 730 and the MME 724 may enable transfer of subscription and authentication data for authenticating/authorizing user access to the LTE CN 720.

The PGW 732 may terminate an SGi interface toward a data network (DN) 736 that may include an application/content server 738. The PGW 732 may route data packets between the LTE CN 722 and the data network 736. The PGW 732 may be coupled with the SGW 726 by an S5 reference point to facilitate user plane tunneling and tunnel management. The PGW 732 may further include a node for policy enforcement and charging data collection (for example, PCEF). Additionally, the SGi reference point between the PGW 732 and the data network 736 may be an operator external public, a private PDN, or an intra-operator packet data network, for example, for provision of IMS services. The PGW 732 may be coupled with a PCRF 734 via a Gx reference point.

The PCRF 734 is the policy and charging control element of the LTE CN 722. The PCRF 734 may be communicatively coupled to the app/content server 738 to determine appropriate QoS and charging parameters for service flows. The PCRF 732 may provision associated rules into a PCEF (via Gx reference point) with appropriate TFT and QCI.

In some embodiments, the CN 720 may be a 5GC 740. The 5GC 740 may include an AUSF 742, AMF 744, SMF 746, UPF 748, NSSF 750, NEF 752, NRF 754, PCF 756, UDM 758, and AF 760 coupled with one another over interfaces (or "reference points") as shown. Functions of the elements of the 5GC 740 may be briefly introduced as follows.

The AUSF 742 may store data for authentication of UE 702 and handle authentication-related functionality. The AUSF 742 may facilitate a common authentication framework for various access types. In addition to communicating with other elements of the 5GC 740 over reference points as shown, the AUSF 742 may exhibit an Nausf service-based interface.

The AMF 744 may allow other functions of the 5GC 740 to communicate with the UE 702 and the RAN 704 and to subscribe to notifications about mobility events with respect to the UE 702. The AMF 744 may be responsible for registration management (for example, for registering UE 702), connection management, reachability management, mobility management, lawful interception of AMF-related events, and access authentication and authorization. The AMF 744 may provide transport for SM messages between the UE 702 and the SMF 746, and act as a transparent proxy for routing SM messages. AMF 744 may also provide transport for SMS messages between UE 702 and an SMSF. AMF 744 may interact with the AUSF 742 and the UE 702 to perform various security anchor and context management functions. Furthermore, AMF 744 may be a termination point of a RAN CP interface, which may include or be an N2 reference point between the RAN 704 and the AMF 744; and the AMF 744 may be a termination point of NAS (N1) signaling, and perform NAS ciphering and integrity protection. AMF 744 may also support NAS signaling with the UE 702 over an N3 IWF interface.

The SMF 746 may be responsible for SM (for example, session establishment, tunnel management between UPF 748 and AN 708); UE IP address allocation and management (including optional authorization); selection and control of UP function; configuring traffic steering at UPF 748 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 744 over N2 to AN 708; and determining SSC mode of a session. SM may refer to management of a PDU session, and a PDU session or "session" may refer to a PDU connectivity service that provides or enables the exchange of PDUs between the UE 702 and the data network 736.

The UPF 748 may act as an anchor point for intra-RAT and inter-RAT mobility, an external PDU session point of interconnect to data network 736, and a branching point to support multi-homed PDU session. The UPF 748 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 748 may include an uplink classifier to support routing traffic flows to a data network.

The NSSF 750 may select a set of network slice instances serving the UE 702. The NSSF 750 may also determine allowed NSSAI and the mapping to the subscribed S-NS-SAIs, if needed. The NSSF 750 may also determine the AMF set to be used to serve the UE 702, or a list of candidate AMFs based on a suitable configuration and possibly by querying the NRF 754. The selection of a set of network slice instances for the UE 702 may be triggered by the AMF 744 with which the UE 702 is registered by interacting with the NSSF 750, which may lead to a change of AMF. The NSSF 750 may interact with the AMF 744 via an N22 reference point; and may communicate with another NSSF in a visited network via an N31 reference point (not shown). Additionally, the NSSF 750 may exhibit an Nnssf service-based interface.

The NEF 752 may securely expose services and capabilities provided by 3GPP network functions for third party, internal exposure/re-exposure, AFs (e.g., AF 760), edge computing or fog computing systems, etc. In such embodiments, the NEF 752 may authenticate, authorize, or throttle the AFs. NEF 752 may also translate information exchanged with the AF 760 and information exchanged with internal network functions. For example, the NEF 752 may translate between an AF-Service-Identifier and an internal 5GC information. NEF 752 may also receive information from other NFs based on exposed capabilities of other NFs. This information may be stored at the NEF 752 as structured data, or at a data storage NF using standardized interfaces. The stored information can then be re-exposed by the NEF 752 to other NFs and AFs, or used for other purposes such as analytics. Additionally, the NEF 752 may exhibit an Nnef service-based interface.

The NRF 754 may support service discovery functions, receive NF discovery requests from NF instances, and provide the information of the discovered NF instances to the NF instances. NRF 754 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 754 may exhibit the Nnrf service-based interface.

The PCF 756 may provide policy rules to control plane functions to enforce them, and may also support unified policy framework to govern network behavior. The PCF 756 may also implement a front end to access subscription information relevant for policy decisions in a UDR of the UDM 758. In addition to communicating with functions over reference points as shown, the PCF 756 exhibit an Npcf service-based interface.

The UDM 758 may handle subscription-related information to support the network entities' handling of communication sessions, and may store subscription data of UE 702. For example, subscription data may be communicated via an N8 reference point between the UDM 758 and the AMF 744. The UDM 758 may include two parts, an application front end and a UDR. The UDR may store subscription data and policy data for the UDM 758 and the PCF 756, and/or structured data for exposure and application data (including PFDs for application detection, application request information for multiple UEs 702) for the NEF 752. The Nudr service-based interface may be exhibited by the UDR 221 to allow the UDM 758, PCF 756, and NEF 752 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 758 may exhibit the Nudm service-based interface.

The AF 760 may provide application influence on traffic routing, provide access to NEF, and interact with the policy framework for policy control.

In some embodiments, the 5GC 740 may enable edge computing by selecting operator/$3^{rd}$ party services to be geographically close to a point that the UE 702 is attached to the network. This may reduce latency and load on the network. To provide edge-computing implementations, the 5GC 740 may select a UPF 748 close to the UE 702 and execute traffic steering from the UPF 748 to data network 736 via the N6 interface. This may be based on the UE subscription data, UE location, and information provided by the AF 760. In this way, the AF 760 may influence UPF (re)selection and traffic routing. Based on operator deployment, when AF 760 is considered to be a trusted entity, the network operator may permit AF 760 to interact directly with relevant NFs. Additionally, the AF 760 may exhibit an Naf service-based interface.

The data network 736 may represent various network operator services, Internet access, or third party services that may be provided by one or more servers including, for example, application/content server 738.

FIG. 8 schematically illustrates a wireless network 800 in accordance with various embodiments. The wireless network 800 may include a UE 802 in wireless communication with an AN 804. The UE 802 and AN 804 may be similar to, and substantially interchangeable with, like-named components described elsewhere herein.

The UE 802 may be communicatively coupled with the AN 804 via connection 806. The connection 806 is illustrated as an air interface to enable communicative coupling, and can be consistent with cellular communications protocols such as an LTE protocol or a 5G NR protocol operating at mmWave or sub-6 GHz frequencies.

The UE 802 may include a host platform 808 coupled with a modem platform 810. The host platform 808 may include application processing circuitry 812, which may be coupled with protocol processing circuitry 814 of the modem platform 810. The application processing circuitry 812 may run various applications for the UE 802 that source/sink application data. The application processing circuitry 812 may further implement one or more layer operations to transmit/receive application data to/from a data network. These layer operations may include transport (for example UDP) and Internet (for example, IP) operations The protocol processing circuitry 814 may implement one or more of layer operations to facilitate transmission or reception of data over the connection 806. The layer operations implemented by the protocol processing circuitry 814 may include, for example, MAC, RLC, PDCP, RRC and NAS operations.

The modem platform 810 may further include digital baseband circuitry 816 that may implement one or more layer operations that are "below" layer operations performed by the protocol processing circuitry 814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 810 may further include transmit circuitry 818, receive circuitry 820, RF circuitry 822, and RF front end (RFFE) 824, which may include or connect to one or more antenna panels 826. Briefly, the transmit circuitry 818 may include a digital-to-analog converter, mixer, intermediate frequency (IF) components, etc.; the receive circuitry 820 may include an analog-to-digital converter, mixer, IF components, etc.; the RF circuitry 822 may include a low-noise amplifier, a power amplifier, power tracking components, etc.; RFFE 824 may include filters (for example, surface/bulk acoustic wave filters), switches, antenna tuners, beamforming components (for example, phase-array antenna components), etc. The selection and arrangement of the components of the transmit circuitry 818, receive circuitry 820, RF circuitry 822, RFFE 824, and antenna panels 826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 814 may include one or more instances of control circuitry (not shown) to provide control functions for the transmit/receive components.

A UE reception may be established by and via the antenna panels 826, RFFE 824, RF circuitry 822, receive circuitry 820, digital baseband circuitry 816, and protocol processing circuitry 814. In some embodiments, the antenna panels 826 may receive a transmission from the AN 804 by receive-beamforming signals received by a plurality of antennas/antenna elements of the one or more antenna panels 826.

A UE transmission may be established by and via the protocol processing circuitry 814, digital baseband circuitry 816, transmit circuitry 818, RF circuitry 822, RFFE 824, and antenna panels 826. In some embodiments, the transmit components of the UE 804 may apply a spatial filter to the data to be transmitted to form a transmit beam emitted by the antenna elements of the antenna panels 826.

Similar to the UE 802, the AN 804 may include a host platform 828 coupled with a modem platform 830. The host platform 828 may include application processing circuitry 832 coupled with protocol processing circuitry 834 of the modem platform 830. The modem platform may further include digital baseband circuitry 836, transmit circuitry 838, receive circuitry 840, RF circuitry 842, RFFE circuitry 844, and antenna panels 846. The components of the AN 804 may be similar to and substantially interchangeable with like-named components of the UE 802. In addition to performing data transmission/reception as described above, the components of the AN 808 may perform various logical functions that include, for example, RNC functions such as radio bearer management, uplink and downlink dynamic radio resource management, and data packet scheduling.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940 or other interface circuitry. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processors 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface controllers, components, or other suitable devices to communicate with one or more peripheral devices 904 or one or more databases 906 or other network elements via a network 908. For example, the communication resources 930 may include wired communication components (e.g., for coupling via USB, Ethernet, etc.), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Some non-limiting examples of various embodiments are provided below.

Example 1 includes one or more non-transitory, computer-readable media (NTCRM) having instructions, stored thereon, that when executed by one or more processors of a remote radio unit (RRU) cause the RRU to: receive a multiple input, multiple output (MIMO) signal from one or more user equipments (UEs); obtain channel measurements associated with a first UE of the one or more UEs on respective channels of a plurality of channels; perform maximum ratio combining (MRC) on the MIMO signal based on the channel measurements of the plurality of channels to generate a processed signal; and send the processed signal to a baseband unit (BBU) to decode data from the processed signal.

Example 2 includes the one or more NTCRM of example 1, wherein the plurality of channels include multiple receive beams.

Example 3 includes the one or more NTCRM of example 1 or 2, wherein the plurality channels are associated with different time domain resources.

Example 4 includes the one or more NTCRM of any of examples 1-3, wherein the plurality of channels are associated with different frequency domain resources.

Example 5 includes the one or more NTCRM of any of examples 1-4, wherein the plurality of channels are associated with different spatial domain resources.

Example 6 includes the one or more NTCRM of any of examples 1-5, wherein the channel measurements are derived from respective sounding reference signals (SRSs) received from the first UE.

Example 7 includes the one or more NTCRM of any of examples 1-6, wherein the channel measurements correspond to a number of most recent channel measurements.

Example 8 includes the one or more NTCRM of any of examples 1-6, wherein the instructions, when executed, are further to cause the RRU to determine a set of the channel measurements to be used based on a correlation between a new channel measurement and channel measurements of a previous set of channel measurements.

Example 9 includes the one or more NTCRM of any of examples 1-8, wherein the MRC is performed according to:

$$W_{MRC,ext} = \begin{bmatrix} h_{i+1}^H \\ \vdots \\ h_{i+L}^H \end{bmatrix},$$

wherein $W_{MRC,ext}$ is the processed signal, $h_k$ is the respective channel, and $(\ )^H$ is a Hermitian conjugation operation.

Example 10 includes one or more non-transitory, computer-readable media (NTCRM) having instructions, stored thereon, that when executed by one or more processors of a baseband unit (BBU) cause the BBU to: receive a processed signal from a remote radio unit (RRU) after a first phase of processing on a multiple input, multiple output (MIMO) signal received from one or more user equipments (UEs), wherein the first phase of processing includes maximum ratio combining (MRC) based on measurements on respective measurement signals transmitted by the UE in multiple channels; perform a second phase of processing on the processed signal to generate an output signal, wherein the second phase of processing includes to generate a linear combination of compressed signals in the processed signal according to a linear minimum mean square error (LMMSE); and pass the output signal to a symbol decoder to decode data from the output signal.

Example 11 includes the one or more NTCRM of example 10, wherein the generation of the linear combination according to the LMMSE includes interference rejection.

Example 12 includes the one or more NTCRM of example 10 or 11, wherein to perform the second phase of processing further includes to perform channel and interference plus noise covariance matrix estimation using demodulation reference signals (DM-RSs).

Example 13 includes the one or more NTCRM of any of examples 10-12, wherein the measurements in the multiple channels are obtained on different time domain resources.

Example 14 includes the one or more NTCRM of any of examples 10-13, wherein the measurements in the multiple channels are obtained in different frequency domain resources.

Example 15 includes the one or more NTCRM of any of examples 10-14, wherein the measurements in the multiple channels are obtained in different spatial domain resources.

Example 16 includes the one or more NTCRM of any of examples 10-15, wherein the measurement signals are sounding reference signals (SRSs).

Example 17 includes the one or more NTCRM of any of examples 10-16, wherein the measurements correspond to a number of most recent measurements.

Example 18 includes the one or more NTCRM of any of examples 10-16, wherein the measurements correspond to a set of measurements determined based on a correlation between a new measurement and measurements of a previous set of measurements.

Example 19 includes the one or more NTCRM of any of examples 10-18, wherein the MRC is performed according to:

$$W_{MRC,ext} = \begin{bmatrix} h_{i+1}^H \\ \vdots \\ h_{i+L}^H \end{bmatrix},$$

wherein $W_{MRC,ext}$ is the processed signal, $h_k$ is the respective channel, and $(\ )^H$ is a Hermitian conjugation operation.

Example 20 includes an apparatus to be implemented in a remote radio unit (RRU), the apparatus comprising: radio frequency (RF) interface circuitry; and processor circuitry coupled to the RF interface circuitry. The processor circuitry is to: receive, via the RF interface circuitry, a multiple input, multiple output (MIMO) signal from one or more user equipments (UEs); obtain a plurality of sounding reference signal (SRS) channel measurements for SRSs received from a first UE of the one or more UEs in respective channels; perform maximum ratio combining (MRC) on the MIMO signal based on the SRS channel measurements to generate a processed signal; and send the processed signal to a baseband unit (BBU) via a fronthaul link.

Example 21 includes the apparatus of example 20, wherein the plurality channels are associated with different time domain resources, different frequency domain resources, and/or different spatial domain resources.

Example 22 includes the apparatus of example 20 or 21, wherein the SRS channel measurements correspond to a number of most recent SRS channel measurements.

Example 23 includes the apparatus of example 20 or 21, wherein the processor circuitry is further to determine a set of the SRS channel measurements to be used based on a correlation between a new SRS channel measurement and SRS channel measurements of a previous set of SRS channel measurements.

Example 24 includes the apparatus of any of examples 20-23, wherein the MRC is performed according to:

$$W_{MRC,ext} = \begin{bmatrix} h_{i+1}^H \\ \vdots \\ h_{i+L}^H \end{bmatrix},$$

wherein $W_{MRC,ext}$ is the processed signal, $h_k$ is the respective channel, and $(\ )^H$ is a Hermitian conjugation operation.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The invention claimed is:

1. One or more non-transitory, computer-readable media (NTCRM) having instructions, stored thereon, that when executed by one or more processors of a remote radio unit (RRU) cause the RRU to:
   receive a multiple input, multiple output (MIMO) signal from one or more user equipments (UEs);
   obtain channel measurements associated with a first UE of the one or more UEs on respective channels of a plurality of channels;
   perform maximum ratio combining (MRC) on the MIMO signal based on the channel measurements of the plurality of channels to generate a processed signal; and
   send the processed signal to a baseband unit (BBU) to decode data from the processed signal, wherein the plurality of channels are associated with different time domain resources, different frequency domain resources, and/or different spatial domain resources.

2. The one or more NTCRM of claim 1, wherein the plurality of channels include multiple receive beams.

3. The one or more NTCRM of claim 1, wherein the channel measurements are derived from respective sounding reference signals (SRSs) received from the first UE.

4. The one or more NTCRM of claim 1, wherein the channel measurements correspond to a number of most recent channel measurements.

5. The one or more NTCRM of claim 1, wherein the instructions, when executed, are further to cause the RRU to determine a set of the channel measurements to be used based on a correlation between a new channel measurement and channel measurements of a previous set of channel measurements.

6. The one or more NTCRM of claim 1, wherein the MRC is performed according to:

$$W_{MRC,ext} = \begin{bmatrix} h_{i+1}^H \\ \vdots \\ h_{i+L}^H \end{bmatrix},$$

wherein $W_{MRC,ext}$ is the processed signal, $h_k$ is the respective channel, and $(\ )^H$ is a Hermitian conjugation operation.

7. The one or more NTCRM of claim 1, wherein the plurality of channels are associated with the different time domain resources.

8. The one or more NTCRM of claim 1, wherein the plurality of channels are associated with the different frequency domain resources.

9. The one or more NTCRM of claim 1, wherein the plurality of channels are associated with the different spatial domain resources.

10. One or more non-transitory, computer-readable media (NTCRM) having instructions, stored thereon, that when executed by one or more processors of a baseband unit (BBU) cause the BBU to:
  receive a processed signal from a remote radio unit (RRU) after a first phase of processing on a multiple input, multiple output (MIMO) signal received from one or more user equipments (UEs), wherein the first phase of processing includes maximum ratio combining (MRC) based on measurements on respective measurement signals transmitted by the one or more UEs in multiple channels;
  perform a second phase of processing on the processed signal to generate an output signal, wherein the second phase of processing includes to generate a linear combination of compressed signals in the processed signal according to a linear minimum mean square error (LMMSE); and
  pass the output signal to a symbol decoder to decode data from the output signal, wherein the measurements correspond to a set of measurements determined based on a correlation between a new measurement and measurements of a previous set of measurements.

11. The one or more NTCRM of claim 10, wherein the generation of the linear combination according to the LMMSE includes interference rejection.

12. The one or more NTCRM of claim 10, wherein to perform the second phase of processing further includes to perform channel and interference plus noise covariance matrix estimation using demodulation reference signals (DM-RSs).

13. The one or more NTCRM of claim 10, wherein the measurements in the multiple channels are obtained on different time domain resources.

14. The one or more NTCRM of claim 10, wherein the measurements in the multiple channels are obtained in different frequency domain resources.

15. The one or more NTCRM of claim 10, wherein the measurements in the multiple channels are obtained in different spatial domain resources.

16. The one or more NTCRM of claim 10, wherein the measurement signals are sounding reference signals (SRSs).

17. The one or more NTCRM of claim 10, wherein the measurements correspond to a number of most recent measurements.

18. The one or more NTCRM of claim 10, wherein the MRC is performed according to:

$$W_{MRC,ext} = \begin{bmatrix} h_{i+1}^H \\ \vdots \\ h_{i+L}^H \end{bmatrix},$$

wherein $W_{MRC,ext}$ is the processed signal, $h_k$ is the respective channel, and $(\ )^H$ is a Hermitian conjugation operation.

19. An apparatus to be implemented in a remote radio unit (RRU), the apparatus comprising:
  radio frequency (RF) interface circuitry; and
  processor circuitry coupled to the RF interface circuitry, the processor circuitry to:
    receive, via the RF interface circuitry, a multiple input, multiple output (MIMO) signal from one or more user equipments (UEs);
    obtain a plurality of sounding reference signal (SRS) channel measurements for SRSs received from a first UE of the one or more UEs in respective channels;
    perform maximum ratio combining (MRC) on the MIMO signal based on the SRS channel measurements to generate a processed signal; and
  send the processed signal to a baseband unit (BBU) via a fronthaul link, wherein the MRC is performed according to:

$$W_{MRC,ext} = \begin{bmatrix} h_{i+1}^H \\ \vdots \\ h_{i+L}^H \end{bmatrix},$$

wherein $W_{MRC,ext}$ is the processed signal, $h_k$ is the respective channel, and $(\ )^H$ is a Hermitian conjugation operation.

20. The apparatus of claim 19, wherein the plurality of channels are associated with different time domain resources.

21. The apparatus of claim 19, wherein the SRS channel measurements correspond to a number of most recent SRS channel measurements.

22. The apparatus of claim 19, wherein the processor circuitry is further to determine a set of the SRS channel measurements to be used based on a correlation between a new SRS channel measurement and SRS channel measurements of a previous set of SRS channel measurements.

23. The apparatus of claim 19, wherein the plurality of channels are associated with different frequency domain resources.

24. The apparatus of claim 19, wherein the plurality of channels are associated with different spatial domain resources.

* * * * *